Patented Jan. 10, 1950

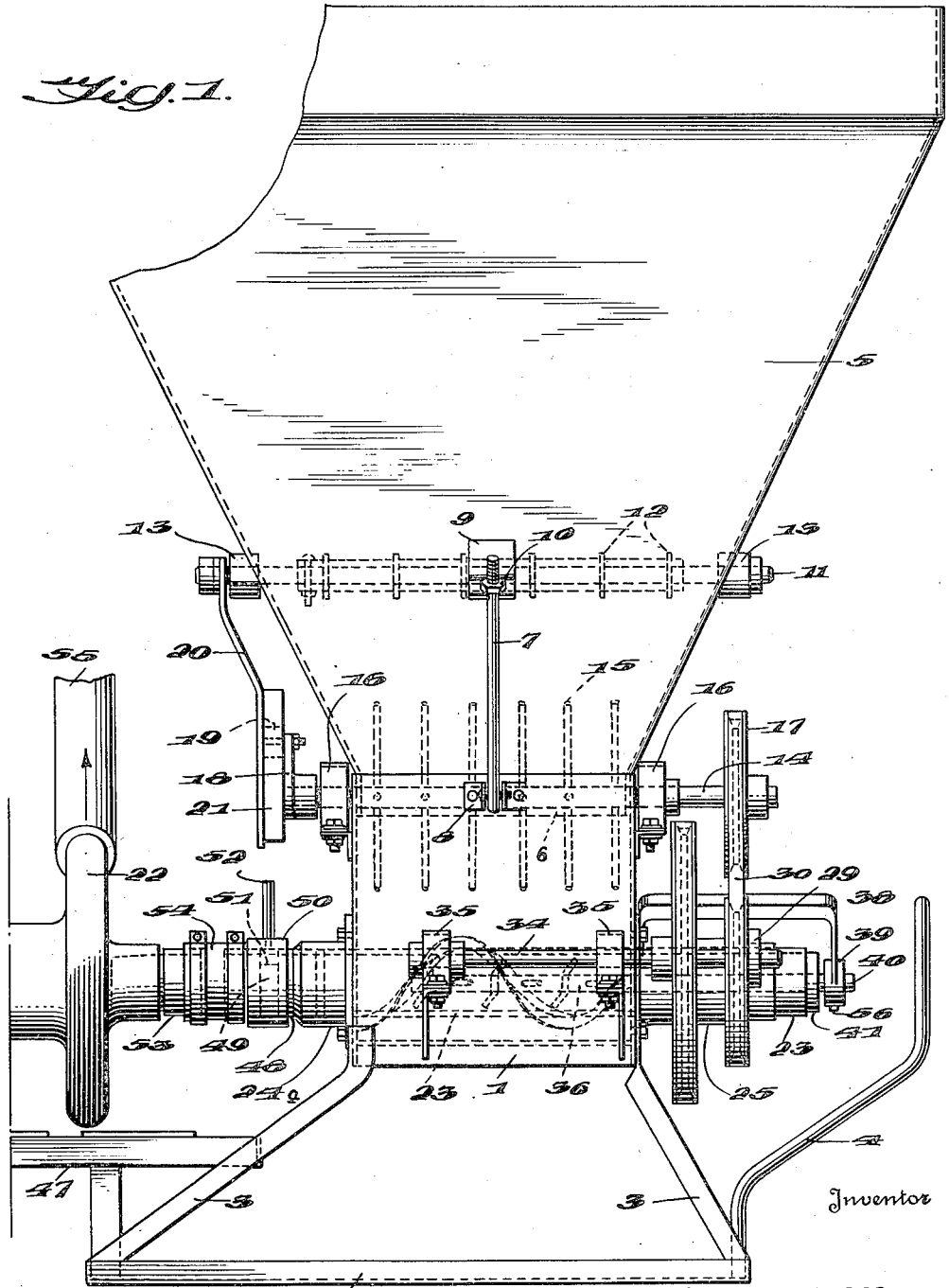

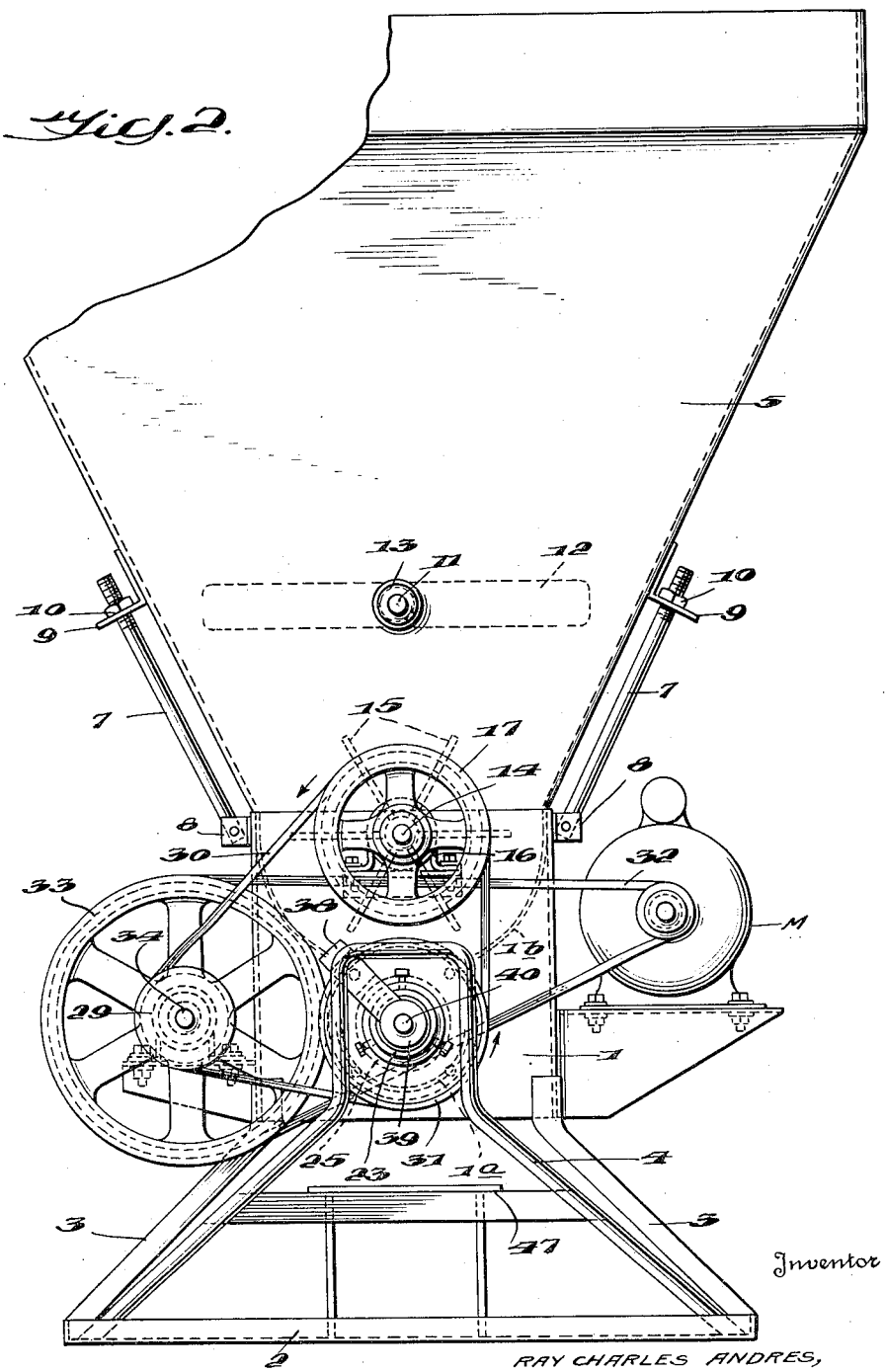

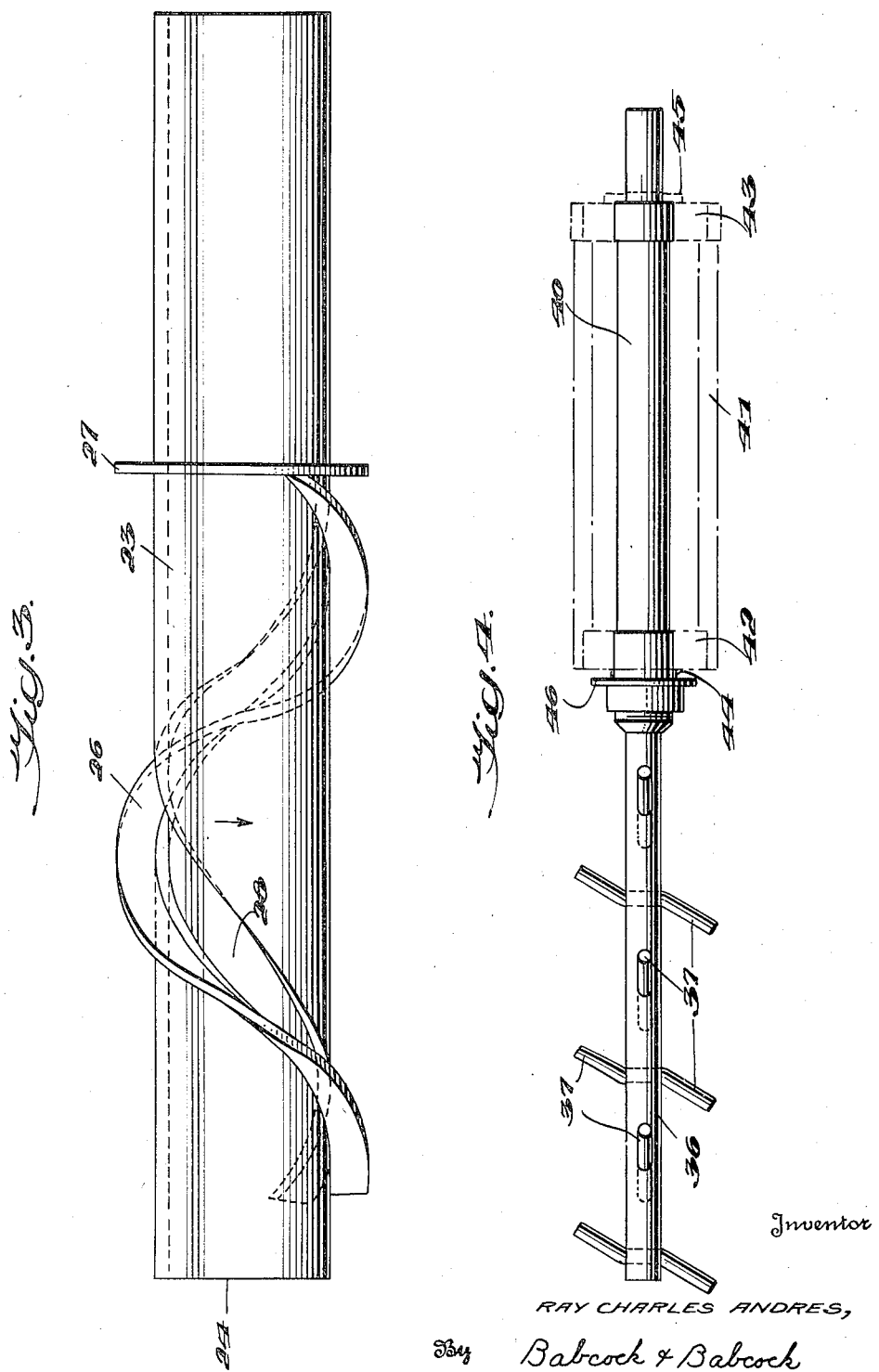

2,494,500

UNITED STATES PATENT OFFICE 2,494,500

PNEUMATIC CONVEYING MACHINE

Ray Charles Andres, Big Rapids, Mich., assignor to Home Protection Company, Inc., a corporation of Michigan Application April 28, 1947, Serial No. 744,399

12 Claims. (Cl. 302—17)

This invention relates to pneumatic conveying machines of the type employing a hopper or other suitable means for supplying fluent solid materials, such as usual finely divided or flocculent building insulation material, to the pneumatic conveyer, and more particularly to feed regulating mechanism incorporated in such a machine for automatically controlling the transfer of material from the hopper to the pneumatic conveyer responsive to changes in the operative condition of the conveyer.

In such machines the discharge end of the usual conveyer tube or conduit is generally disposed at some distance from the remainder of the machine. In many fields of use, as for instance in the application of insulating material to the walls or other portions of a building, it is highly desirable that a workman handling the discharge end of said tube should be able to stop and resume the discharge of material at will, easily and quickly, as by closing the discharge opening of said tube. Heretofore, where this was attempted, it invariably resulted in the machine becoming plugged or clogged with material due to the fact that the material continued to flow from the hopper into the pneumatic conveyer despite the closing of the latter. This made it necessary to delegate the control of the material flow to a second workman stationed at the machine who acted in accordance with verbal or signalled instructions from the first workman.

The present invention has been conceived and developed with the foregoing considerations in mind, and consequently has for its broad primary object to provide a pneumatic conveying machine in which the conveyer discharge may be closed off as desired to interrupt the flow of material without resulting in clogging or jamming as aforementioned, so that subsequent opening of the discharge opening will cause an immediate resumption of the flow and discharge of material.

A further object is to provide in such a machine novel feed regulating mechanism for attaining the foregoing broad object.

A still further object is to provide improved means for regulating the volume of flow of material through the conveyer.

To accomplish these objects I provide in such a machine a hollow rotary shaft having its interior in communication with the pneumatic conveyer, the hopper or other supply means being arranged to supply material to the cylindrical exterior of the shaft. The shaft is provided with a spiral intake slot or port to permit entry of the material to its hollow interior, the arrangement being such that the material received interiorly of the shaft is permitted to move axially into the fluid current of the pneumatic conveyer. Adjacent and preferably contiguous to the intake port is an externally projecting spiral flange, and the rotation of the shaft is in such a direction that this flange urges the material exteriorly of the shaft in an axial direction reverse to the interior flow of material in said shaft. Interiorly of the shaft there is provided an agitator having portions adapted to brush across the spiral intake slot during rotation of the shaft. Preferably the air intake for the conveyer is interposed between the conveyer and the feed regulating mechanism, and a suitable valve is applied thereto to regulate the volume of flow of air and material through the conveyer.

The combined action of these aforementioned elements of the feed regulating mechanism is such that a constant flow of loosely packed finely divided material is delivered to the pneumatic conveyer as long as a sufficient flow of air continues therethrough. However when this air flow is interrupted at any point, as by the operator placing his hand over or otherwise closing or obstructing the discharge end of the conveyer tube, the material is permitted to accumulate in the hollow shaft until same becomes substantially full of material which is maintained therein in a loose, unpacked, free flowing condition. This accumulated material acts in conjunction with the stationary agitator and the spiral flange to prevent the admission of additional material such as would pack into and clog the hollow shaft and/or conveyer, and said accumulated material is thus maintained ready for passage through the conveyer upon resumption of the air flow therethrough.

In this invention I show and describe only the preferred embodiment of my invention simply by way of illustration of the practice thereof, as by law required. However I recognize that my invention is capable of other and different embodiments, and that the various details thereof may be modified, all without departing from said invention. Therefore the drawings and description herein are to be considered as merely illustrative and not as exclusive.

In the accompanying drawings:

Figure 1 represents a side elevation of a pneumatic conveying machine embodying the preferred form of the invention;

Figure 2, an end elevation of the machine illustrated in Figure 1;

Figure 3, an enlarged detail side elevation of the hollow shaft of the feed regulating mechanism; and, Figure 4, a similarly enlarged detail side elevation of the stationary agitator of the feed regulating mechanism, the end sealing means for the aforementioned hollow shaft being shown in broken lines.

Referring now in detail to the accompanying drawings, the reference character 1 designates a feed box or chamber which in the present embodiment is of cuboidal external shape opening upwardly to receive material thereinto. Interiorly, said feed box is preferably provided with an upwardly opening sheet metal channel or trough (designated by the reference character 1a in Figure 2) having a rounded bottom concentric to the rotary hollow shaft 23 of the feed regulating mechanism to direct the material into engagement therewith. This trough preferably has upwardly diverging arcuate sides or extensions 1b concentric with the rotary agitator shaft 14 to permit said agitator to readily engage the material passing between said sides.

Suitable means for supporting the feed box 1 may comprise a generally rectangular base 2 having rigid supporting legs 3 secured to the respective corners of the feed box 1 as shown, the base 2 and legs 3 being fabricated from usual angle iron stock and assembled in usual manner. If desired, the base 2 may be provided with a rigid metal handle 4 to facilitate moving and positioning of the machine.

In order to deliver material to the feed box 1 a usual solid material conveying or supplying device such as the hopper 5 is utilized. Such a hopper 5 is shown mounted on the feed box 1 to discharge material through its lower constricted end or throat into the feed box. In the preferred embodiment, the throat of the hopper is provided with a depending marginal flange 6 conforming in shape and dimensions to the intake opening of the feed box 1 to be snugly received therein. The hopper 5 and feed box 1 are maintained in this assembled relation by usual means such as bolts 7 extending between and connected to brackets 8 and 9 respectively mounted on said feed box 1 and hopper 5.

Since it is desirable to deliver a constant flow of material to the feed box 1 in a loose free flowing condition, the hopper 5 is preferably provided with a usual oscillating shaker, and a rotary agitator is disposed in the feed box therebeneath. The shaker comprises a rock shaft 11 carrying a plurality of spaced parallel arms 12, the ends of the shaft 11 being journalled for oscillation through bearings 13, 13 mounted in opposite end walls of the hopper 5.

The rotary agitator comprises a shaft 14 carrying a plurality of radial beater arms 15, the ends of this shaft being rotatably journalled through bearings 16, 16 respectively mounted in opposite end walls of the feed box 1.

On one of the externally projecting ends of the shaft 14 is fixed a usual sheave 17 which may be driven by a belt 30 from a drive sheave 29, as shown.

On the opposite end of said shaft 14 is fixed a crank 18 carrying a roller 19. A cooperating crank arm 20 carried by the corresponding end of rock shaft 11 is provided at its free end with spaced parallel walls 21 defining between them a linear channel in which the roller 19 may work to impart an oscillating or rocking movement to the shaker shaft 11.

It will thus be apparent that the shaker and agitator aforementioned will cause a continuous supply of finely divided loosely packed material to descend through the hopper into the feed box, to be acted on by the feed regulating means of the invention.

The feed regulating means or mechanism of the invention which serves to transfer the material from the feed box to the pneumatic conveyer 22, comprises a hollow cylindrical sleeve or shaft 23 extending across the interior of the feed box substantially coaxially in the trough 1a, with one end portion projecting through an end of said feed box and rotatably supported in a suitable axially elongated bearing 25 for rotation about a horizontal axis. The other end of said shaft projects through the opposite end of the feed box to be loosely received in a housing 24a, the clearance between the shaft 23 and housing 24a being sufficient to prevent packing of material therebetween.

One end 24 of the shaft 23 opens axially within the housing 24a to function as a discharge port communicating with the hollow interior of the shaft.

Welded or otherwise fixedly secured to the shaft 23 within the feed box 1 is a radially projecting spiral flange or impeller 26 which is so arranged relative to the direction of rotation of the shaft and the discharge end 24 of said shaft as to urge the material in the trough 1a axially away from the discharge end 24 in a direction reverse to the passage of material interiorly of said shaft. To prevent the flange 26 from forcing the material into the bearing 25 it is desirable to provide a suitably located annular baffle 27 which may be welded to said shaft 23.

Material is admitted to the interior of the shaft 23 through a spiral intake slot or port 28 which is disposed to lead the flange 26 in rotation and has its rear or following edge substantially contiguous to said flange.

Any suitable means may be employed for rotating the shaft 23 in the proper direction, as indicated by the arrow in Figure 3, the same means also preferably being employed to drive the rotary agitator shaft 14 aforementioned. To this end in the illustrated embodiment the end of shaft 23 opposite to the discharge end 24 thereof projects externally of the feed box 1 through the bearing 25 and is provided with a driven sheave 31 which is secured thereon to receive rotation by belt 30 from a suitable power source.

Such a power source may consist of a conventional electric motor M which imparts rotation through the belt 32 and speed reduction sheave 33 to a drive shaft 34, on which is mounted the drive sheave or pulley wheel 29 aforementioned. In the embodiment shown, this shaft 34 is journalled in bearings 35, 35 mounted on the side of the feed box 1, as shown in Figure 1.

The aforementioned belt 30 is passed around this drive pulley 29 and the driven pulleys 31 and 17 to transmit rotation to both of the shafts 23 and 11.

Disposed coaxially within the feed regulator shaft 23 is a fixed agitator which prevents the material within the shaft 23 from rotating therewith. This agitator comprises a stationary shaft 36 which carries a series of radially projecting studs or arms 37 preferably arranged in staggered relation and axially coextensive with the slot 28. At their free ends, these arms 37 are preferably in near engagement with the interior of the shaft 23.

I prefer to support the fixed agitator shaft 36 in its operative position by means comprising a bracket 38 mounted on the drive end of the feed box 1 and provided with an annular collar 39 in axial alignment with shaft 23. The agitator shaft 36 is provided with an axial extension or shank 40 which projects through the axial opening in the driven end of shaft 23 to be received in and secured against rotation in the collar 39, as by means of set screw 56.

In order to accurately center the shaft 36 within the hollow shaft 23 and at the same time close the driven end of said shaft 23 against the admission of air, suitable sealing means may be provided as shown in broken lines in Figure 4. Such means comprises a bushing 41 supported in coaxial relation on the shank 40 by means of bearings 42 and 43 respectively rotatable on the shank 40. The diameter of the bushing 41 is such that it makes a reasonably snug fit into the end of the hollow shaft 23. Axial displacement of the bearings 42 and 43 is prevented in one direction by the annular shoulder 44 formed on the shank 40 to engage bearing 42, and a pin 45 driven through the shank 40 prevents movement of the bearing 43 in the other axial direction. If desired, a suitable bearing shield 46 may be threaded on the shank 40 to prevent material from entering the bearing 42.

The pneumatic conveyor 22 may be of any usual type, and may be coupled to the hollow shaft 23 in any suitable manner to receive material from the interior thereof.

In the preferred embodiment of the invention the pneumatic conveyor 22 is in the form of a usual centrifugal blower supported on a platform 47 adjacent the discharge end of the hollow shaft 23, the blower and platform being shown fragmentarily in Figure 1 of the drawings.

This blower 22 has its intake disposed in communication with the discharge end 24 of the hollow shaft 23 by coupling means preferably having an air intake control valve interposed therein to regulate the volume of flow of material.

In the illustrated arrangement, this air control valve is in the form of a bushing 48 having one end snugly received and secured in the housing 24a with its interior in communication with the discharge end of the hollow shaft 23. Formed through the cylindrical wall of this bushing is a circumferentially extending air intake slot 49. A valve sleeve 50 rotatable on this bushing 48 is formed with a similar circumferentially extending slot 51. An actuating handle 52 is provided to facilitate rotary adjustment of the valve sleeve 50 so that the slots or apertures 49 and 51 may be placed in or out of registry to varying degrees, thereby varying the intake of air to the blower 22.

In addition to this valve, the coupling means also preferably comprises a suitable adaptor bushing or fitting 53 which is conformably received in the intake of the blower 22. Between this fitting 53 and the valve bushing 48 is interposed a usual flexible hose coupling 54 to prevent the transmission of vibration between these respective parts.

The blower 22 discharges into a preferably flexible hose or conduit 55 which may be conveniently manipulated to convey the material to various locations.

In the operation of the invention, the hopper 5 is maintained full of flocculent insulating or other fluent solid material which descends through the shaker and rotary agitator aforementioned to be delivered into the trough 1a of the feed box 1 in a loosely divided unpacked condition.

Upon arrival in the feed box trough 1a this material is engaged and agitated by the spiral flange 26 of the shaft 23. Said spiral flange 26 agitates the material and prevents it from packing against the shaft 23 while urging said material away from the discharge end of shaft 23 in an axial direction. Said material is gradually permitted to enter the interior of shaft 23 through the intake slot 28, whereupon it is further agitated and prevented from packing or caking by the action of the agitator arms 37 in conjunction with the rotating shaft 23. This material interiorly of the shaft is free to work axially towards and through the discharge end of shaft 23, where it is picked up by the air current entering through the valve apertures 49 and 51 and carried through the pneumatic conveyor 22 to be discharged through the flexible hose 55.

When the flow of air through the conveyor 22 is interrupted in any manner, as by the operator closing the discharge end of the hose 55, the material will continue to enter and accumulate in the shaft 23 until same becomes substantially full. This accumulated material is maintained in a loose free flowing condition by the stationary agitator as aforementioned, and such accumulated loose material, together with the agitator arms 37 in brushing across the intake slot 28, prevents entry of additional material through said slot, thus eliminating packing and jamming of material within the shaft 23. The spiral flange 26 cooperates in this by backing up the material exteriorly of the shaft 23 and agitating said material to prevent it from packing into the slot 28.

The material, both exteriorly and interiorly of the shaft 23, is thus maintained in a loose free flowing condition in readiness to proceed into and through the shaft 23 upon resumption of the air current.

It will thus be apparent that a workman manipulating the discharge end of the conveyor hose, regardless of his location relative to the remainder of the machine, will be able to cut off and resume the discharge of material at will, simply by closing the discharge end of the hose, and this may be done without danger of clogging the machine thus eliminating the difficulties enumerated in the introductory portion thereof.

Having thus illustrated and described my invention, I claim:

1. Automatic feed regulating mechanism for controlling the feeding of fluent solid materials from a hopper into the fluid current of a pneumatic conveyer comprising a feed box receiving the material from said hopper, an upwardly opening trough of arcuate cross section disposed within said feed box, a cylindrical hollow shaft journalled horizontally across said feed box within and substantially coaxial to said trough, said shaft having axially opening ends projecting exteriorly from said feed box, one of said open ends serving as a material discharge port and being in communication with said conveyer to supply material thereto, and means defining an air intake for the pneumatic conveyer immediately adjacent the discharge port, in combination with a radially outwardly projecting spiral flange formed on said shaft within said feed box, means for rotating said shaft in a direction whereby said flange will urge the material engaged thereby in an axial direction away from said discharge port, said shaft being formed with a spiral intake slot opening through its cylindrical wall into the hollow interior thereof, said slot being contiguous to and leading said flange, a bracket fixed to said feed box adjacent said other open end of the shaft, a fixed agitator carried by said bracket and projecting coaxially into said shaft, said agitator having a plurality of radially projecting arms disposed to brush across said spiral intake slot, and sealing means closing said other open end of the shaft between said shaft and said relatively coaxial agitator.

2. Automatic feed regulating mechanism for regulating the feeding of fluent solid materials from a hopper into the fluid current of a pneumatic conveyer comprising a feed box receiving the material from said hopper, a cylindrical hollow shaft journalled horizontally across said box, said shaft having axially opening ends projecting exteriorly from said box, one of said open ends serving as a material discharge port and being in communication with said conveyer to supply material thereto, in combination with a radially outwardly projecting spiral flange formed on said shaft within said feed box, means for rotating said shaft in a direction whereby said flange will urge the material engaged thereby in an axial direction away from said discharge port, and a spiral intake slot formed through the cylindrical wall of said shaft contiguous to and leading said flange, in combination with a bracket fixed to said feed box adjacent said other open end of said shaft, a fixed agitator carried by said bracket and projecting coaxially into said shaft, said agitator having a plurality of radially projecting arms disposed to brush across said spiral intake slot, and sealing means closing said other open end of said shaft between said shaft and said relatively coaxially projecting agitator.

3. Automatic feed regulating mechanism for controlling the feeding of fluent solid materials from a hopper into the fluid current of a pneumatic conveyer comprising a feed box receiving the material from said hopper, a cylindrical hollow shaft journalled horizontally across said feed box with one axial end of its hollow interior communicating with said pneumatic conveyer to discharge thereinto, means defining a regulable air intake for said pneumatic conveyer immediately adjacent said discharge end of the hollow shaft, a radially outwardly projecting spiral flange formed on said shaft within said feed box, and means for rotating said shaft in a direction whereby said flange urges the material in contact therewith away from the discharge end of said shaft, said shaft being formed with a spiral material intake slot opening through its cylindrical wall into the hollow interior thereof, said slot being disposed forwardly of and with its following edge contiguous to said flange, in combination with a fixed agitator disposed coaxially within said shaft and having radially projecting arms extending into near engagement with the inner surface of said shaft to brush across said spiral slot.

4. Automatic feed regulating mechanism for regulating the feeding of fluent solid materials from a hopper into the fluid current of a pneumatic conveyer comprising a feed box receiving the material from said hopper, a cylindrical hollow shaft journalled horizontally across said feed box with one axial end of its hollow interior communicating with said pneumatic conveyer to discharge thereinto, a radially outwardly projecting spiral flange formed on said shaft, and means for rotating said shaft in a direction whereby said flange urges the material in contact therewith away from the discharge end of said shaft, said shaft being formed with a spiral material intake slot through its cylindrical wall communicating with the hollow interior thereof, said slot being disposed forwardly of and with its following edge contiguous to said flange, in combination with a fixed agitator disposed coaxially within said shaft and having radially projecting arms extending into near engagement with the interior surface of said shaft to brush across the said spiral slot.

5. Automatic feed regulating mechanism for controlling the feeding of fluent solid materials from a hopper into the fluid current of a pneumatic conveyer comprising a feed box receiving the material from said hopper, a cylindrical hollow shaft journalled across the interior of said feed box with its hollow interior in communication with said pneumatic conveyer to discharge axially thereinto, a radially outwardly projecting spiral flange formed on said shaft, and means for rotating said shaft in a direction whereby said flange urges the material engaged thereby in a direction reverse to the flow of material through said shaft, said shaft being formed with a spiral intake slot through its cylindrical wall communicating with the hollow interior thereof, said slot being disposed forwardly of and contiguous to said flange in combination with a fixed agitator projecting coaxially into said shaft and having a series of agitator arms in axially coextensive relation to said spiral intake slot.

6. Automatic feed regulating mechanism for controlling the feeding of fluent solid materials from a hopper into the fluid current of a pneumatic conveyer comprising a feed box receiving the material from said hopper, a cylindrical hollow shaft journalled across the interior of said feed box and having its hollow interior in axial communication with said pneumatic conveyer to discharge thereinto, a radially outwardly projecting spiral flange fixed to said shaft, and means for rotating said shaft in a direction whereby said flange urges the material engaged thereby in a direction reverse to the axial discharge of material from its hollow interior, said shaft being formed with an intake slot through its cylindrical wall communicating with the hollow interior thereof, in combination with a fixed agitator supported coaxially within said shaft with its operative portion in axially coextensive relation to said intake slot.

7. Automatic feed regulating mechanism for controlling the feeding of fluent solid materials from a hopper into the fluid current of a pneumatic conveyer comprising a feed box receiving the material from said hopper, a cylindrical hollow shaft rotatable within said feed box and arranged to have its hollow interior in axial communication with said conveyer, a radially outwardly projecting flange carried by said shaft, and means for rotating said shaft, said shaft being formed with an intake slot contiguous to said flange communicating with the hollow interior thereof, in combination with a fixed agitator supported coaxially within said shaft with its operative portion in axially coextensive relation to said intake slot.

8. Automatic feed regulating mechanism for controlling the feeding of fluent solid materials from a hopper into the fluid current of a pneumatic conveyer comprising a feed box receiving the material from said hopper, a cylindrical hollow shaft journalled across the interior of said feed box with its hollow interior in communication with said pneumatic conveyer to discharge axially thereinto, a radially outwardly projecting spiral flange formed on said shaft, and means for rotating said shaft in a direction whereby said flange urges the material engaged thereby in a direction reverse to the discharge of material into said conveyer, said shaft being formed with a spiral intake slot through its cylindrical wall forwardly of and contiguous to said flange.

9. Automatic feed regulating mechanism for controlling the feeding of fluent solid materials from a hopper into the fluid current of a pneumatic conveyer comprising a feed box receiving the material from said hopper, a cylindrical hollow shaft rotatable within said feed box and having its hollow interior in axial communication with said conveyer, a radially outwardly projecting flange carried by said shaft, and means for rotating said shaft, said shaft being formed with an intake slot through its cylindrical wall communicating with its hollow interior, in combination with a fixed agitator supported coaxially within said shaft with its operative portion in axially coextensive relation to said intake slot.

10. Automatc feed regulating mechanism for controlling the feeding of fluent solid materials from a hopper into the fluid current of a pneumatic conveyer comprising a feed box receiving the material from said hopper, a cylindrical hollow shaft rotatable within said feed box and means for rotating same, the hollow interior of said shaft being in communication with said pneumatic conveyer, and said shaft being formed with an intake slot opening into its interior through its cylindrical wall to permit the passage of said materials from said feed box into said pneumatic conveyer.

11. In a device of the character described, the combination with a feed box of a stationary agitator projecting thereinto, a hollow cylindrical shaft encompassing said agitator and rotatable relative thereto, said shaft being formed with a spiral intake slot through its cylindrical wall and an axially opening discharge port, and a spiral flange projecting from the exterior cylindrical surface of said shaft substantially contiguous to said spiral slot.

12. In a device of the character described, a hollow cylindrical feed regulator shaft open at one axial end to define a discharge port, said shaft being formed with a spiral intake slot through its cylindrical wall, and a spiral flange projecting from the exterior cylindrical surface of said shaft substantially contiguous to said spiral slot.

RAY CHARLES ANDRES.

REFERENCES CITED

The following references are of record in the file of this patent:

UNITED STATES PATENTS

| Number | Name | Date |
| --- | --- | --- |
| 2,026,732 | Farley | Jan. 7, 1936 |